No. 832,528. PATENTED OCT. 2, 1906.
E. C. BENNETT.
REMOVABLE DENTAL BRIDGEWORK.
APPLICATION FILED FEB. 15, 1906.
2 SHEETS—SHEET 1.
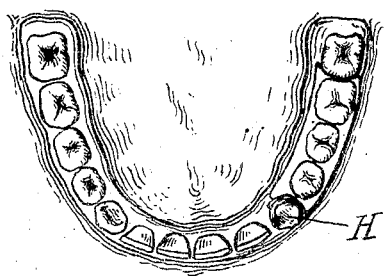
Fig. 1.
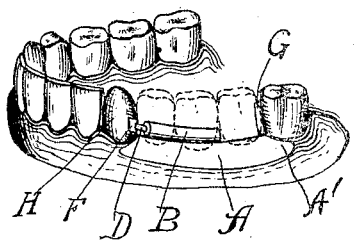
Fig. 2.
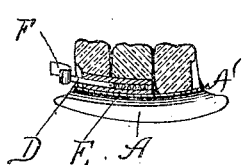
Fig. 3.
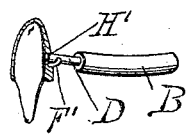
Fig. 7.
Fig. 6.
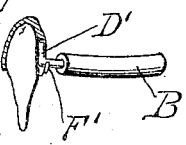
Fig. 8.
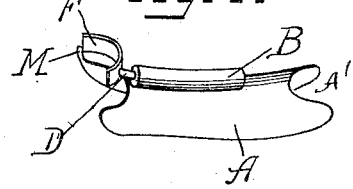
Fig. 4.
Fig. 5.
Witnesses
G. V. Rasmussen
Geo. N. Mitchell
Inventor
ERNEST C. BENNETT
By his Attorneys
Bartlett, Brownell & Mitchell No. 832,528. PATENTED OCT. 2, 1906.
E. C. BENNETT.
REMOVABLE DENTAL BRIDGEWORK.
APPLICATION FILED FEB. 15, 1906.

2 SHEETS—SHEET 2.

Witnesses
G. W. Rasmussen
Geo. H. Mitchell

Inventor
ERNEST C. BENNETT
By his Attorneys
Bartlett, Brownell & Mitchell

UNITED STATES PATENT OFFICE.

ERNEST C. BENNETT, OF NEW YORK, N. Y.

REMOVABLE DENTAL BRIDGEWORK.

No. 832,528. Specification of Letters Patent. Patented Oct. 2, 1906.

Application filed February 15, 1906. Serial No. 301,176.

*To all whom it may concern:*

Be it known that I, ERNEST C. BENNETT, a citizen of the United States, residing at New York, county and State of New York, have invented certain new and useful Improvements in Removable Dental Bridgework, of which the following is a full, clear, and exact description.

My invention relates to improvements in dental "bridgework," so called, the object being to provide a simple, effective, and durable means for removably holding a bridge or artificial denture in place. By making all the mechanical parts of the denture removable it is possible at any time to thoroughly clean and repair the same and render it antiseptic. The denture is applicable to all parts of the mouth, but is particularly useful as a side bridge. By my improvement the denture is firmly and securely held in place and cannot become accidentally detached, a feature which will be recognized by those familiar with the art as being of the most vital importance.

Figure 9:
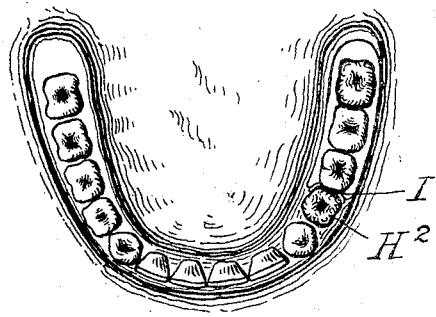
Figure 10:
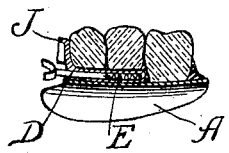
Figure 11:
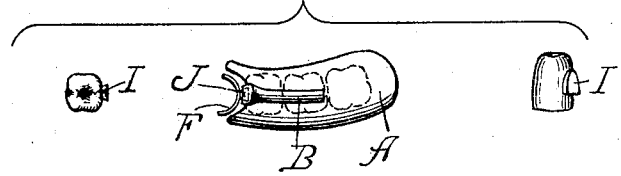
Figure 12:
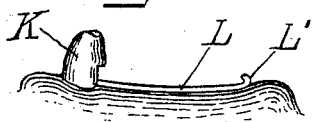
Figure 13:
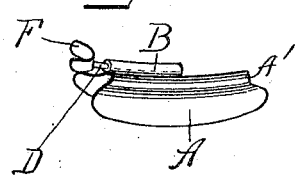

Figure 1 is a plan view illustrative of a set of lower teeth including an artificial denture constructed to embody my invention. Fig. 2 is a perspective view of the same from one side, illustrating the artificial teeth in dotted outline and showing the saddle and locking device in elevation. Fig. 3 is a longitudinal sectional elevation of a bridge shown in Fig. 1, the locking-bolt being shown in elevation. Fig. 4 is a relatively enlarged perspective view of the saddle and locking device shown in Fig. 2 with the artificial teeth removed. Fig. 5 is a perspective view of the locking-bolt detached. Fig. 6 is a view of a detail of construction. Figs. 7 and 8 are side elevations and similar views of two different modifications of the locking end of the locking-bolt. Fig. 9 is a plan view of a lower set of teeth, including a modified form of bridge connection. Fig. 10 is a longitudinal section of the denture shown in Fig. 9. Fig. 11 is a group view of the abutment, tooth, and bridge shown in Fig. 9, the abutment-tooth being shown in two positions. Fig. 12 is a side elevation of a modification of a saddle-retainer adapted to mouths where the rear abutment is absent. Fig. 13 is a perspective view of a saddle and locking device adapted to the retainer shown in Fig. 12.

I have shown in the drawings a variety of forms of my invention; but it will be seen that a characteristic and distinguishing feature in common to all of said forms is a positive locking device whereby the bridge when in place is firmly and securely held and accidental dislodgment absolutely prevented. To operate the locking device, I provide a finger-piece which performs the double function of an operating member and a supporting-clasp. This operating member or finger-piece is so placed relatively to the tooth that mastication will not cause the device to become accidentally released.

In all of the figures, A represents the saddle, the contour of which is in each case appropriate to the particular gum to which the bridge is to be applied. Mounted upon this saddle are the desired number of teeth, said teeth being secured thereon by any of the well-known methods practiced in the art. Mounted upon the saddle A is also a tubular member or socket B, arranged longitudinally of the saddle and having a central bore open at one end to receive the plunger portion D of a locking-bolt. Back of this plunger portion of the locking-bolt and within the longitudinal bore of the tube member B is a suitable spring E, tending in the particular form shown to firmly force or project the plunger outwardly. These parts in their preferred form are entirely disconnected, so that when it is desired to sterilize the bridge or all the various parts access may be had to each portion separately without difficulty. In the preferred form the spring E is provided with ball-like heads E' E' and may be attached to the plunger D in any desirable manner—as, for instance, as shown in Fig. 5—by merely hooking one end of the spring into a perforation in the flattened end of the said plunger. This is simply to prevent accidental loss of the spring.

Secured to the plunger D, as shown in Figs. 1, 2, 3, 4, and 5, is a combined operating member and clasp F, said clasp being so curved as to adapt it to the contour of the adjacent tooth near its base. One or both ends of this clasp F project laterally far enough to permit the wearer to have access thereto for the purpose of operating the bolt to release the bridge. In Fig. 2 I have diagrammatically shown the bridge as it appears in place. In this figure G represents the rear abutment, which is attached to one of the natural teeth, in this instance overhanging the rear end A' of the saddle sufficiently to hold the adjacent end of the bridge down to its seat on the gum and at the same time to prevent rocking of the parts. H represents the forward abutment—in this instance a crown. In the rear edge of this crown-tooth H is an undercut forming an abutment or shoulder under which the clasp F is projected when the forward end of the bridge is down to its seat. By this means the bridge is firmly held against disengagement, and, as will be seen, the clasp is so near the base of the tooth that mastication will not operate it.

In Fig. 7 I have shown a slight modification, in which instead of undercutting the forward abutment (indicated at H') to receive the clasp I have bored a hole of a proper size to receive a forwardly-projecting end of the plunger, the clasp in this instance being indicated by the letter F' and being connected to the bolt slightly to the rear of the locking end.

In Fig. 8 the only modification over that shown in Fig. 7 comprises forming an elongated vertical slot in the crown or abutment and upturning the end of the locking-bolt, as at D', to fit said slot. In this instance the operating-clasp is indicated, as in Fig. 7, by the letter F'.

My artificial denture as thus far described is adapted to mouths in which a forward and rear abutment is provided. It should be understood, of course, that the abutment employed for receiving the thrust of the locking-bolt may be either the forward or rear one, as desired.

In Figs. 9, 10, and 11 I have shown a construction in which a forward abutment only is provided. In this instance H² represents said forward abutment, and to the rear of the same there is permanently secured a dovetailed projection I. At the forward edge of the forward bridge-tooth there is a suitable socket J, adapted to the projection I. This socket is permanently secured to the saddle A. The bolt in this construction is similar to that shown and described in connection with Figs. 1 to 5. The dovetailed projection I in this instance acts as a vertical shoulder to prevent the lateral dislodgment of the bridge.

In Fig. 12 I have shown a construction in which K represents the forward abutment, having an undercut constituting a shoulder to receive the clasp F of the locking-bolt. In this instance I also provide a rearwardly-extending wire or piece L, having a hooked rear end L'. This piece L is permanently secured to the tooth or forward abutment K and lies rigidly against the gum, as shown in Fig. 12. The hooked end L' constitutes an artificial rear abutment for the rear end A' of the saddle A. The locking devices employed in this modification may of course be any one of those already described. Where the removable bridge is located between two teeth or abutments, the action of the spring-pressed plunger in some cases may be such as to regulate or displace one or more of the teeth.

To prevent this, a stop M may be provided, as shown in Fig. 4. The longitudinal movement of the plunger or locking device in this case is just sufficient to cause it to engage underneath the lateral projection on the abutment.

I am aware that removable bridges are not broadly new; but heretofore the same have been retained in place by friction devices and by catches operated by means that are interfered with by mastication. By my arrangement, however, the operating device is removed from the cusp portion of the tooth as far as possible and is mainly hidden in the space between two adjacent teeth and near the gum or saddle, with the result that the bridge cannot be detached except at the will of the wearer.

What I claim, and desire to secure by Letters Patent, is—

1. A removable bridge comprising a saddle, artificial teeth supported thereon and secured thereto, a longitudinally-movable locking device, and a laterally-projecting locking operating device arranged at the side of said bridge and closely adjacent to the saddle.

2. A removable bridge comprising a saddle for carrying one or more artificial teeth, a tubular member longitudinally supported thereon, and a plunger and spring operating in said tubular member.

3. A denture comprising a stationary abutment having a lateral projection, a removable bridge member comprising a saddle, one or more artificial teeth carried thereby, a longitudinally-movable locking device carried by said saddle movable independently of any tooth and adapted to coöperate with said lateral projection, and means for preventing the longitudinal movement of said saddle away from said abutment.

4. A denture comprising two stationary abutments and a removable bridge, said bridge comprising a saddle, an artificial tooth fixedly carried thereby, and a longitudinally-movable locking device at one end of said saddle adapted to engage one of said abutments, the opposite end of said saddle having a projecting portion adapted to engage the other abutment.

5. A denture comprising two stationary abutments and a removable bridge, said bridge comprising a saddle, an artificial tooth fixedly carried thereby, a longitudinally-movable locking device at one end of said saddle adapted to engage one of said abutments, the opposite end of said saddle having a projecting portion adapted to engage the other abutment, and means carried by said bridge for limiting the longitudinal movement of said locking device.

6. A removable bridge comprising a saddle, a spring-pressed longitudinally-movable locking device carried thereby, a laterally-projecting operating device therefor, and a stop-shoulder carried by said saddle acting to limit longitudinal movement of said locking device when said saddle is in operative position in the mouth.

7. A removable bridge comprising a saddle for carrying one or more artificial teeth, a longitudinally-movable spring-pressed plunger supported on said saddle, and means carried by the saddle for limiting its outward movement.

8. A denture comprising two stationary abutments and a removable bridge, said bridge comprising a saddle for supporting one or more artificial teeth, a movable locking device carried by one end of said saddle and engaging one of said abutments, and an integral projecting portion at the opposite end of said saddle engaging the other abutment.

ERNEST C. BENNETT.

Witnesses:
 GEO. H. MITCHELL,
 L. VREELAND.